Figure 1:
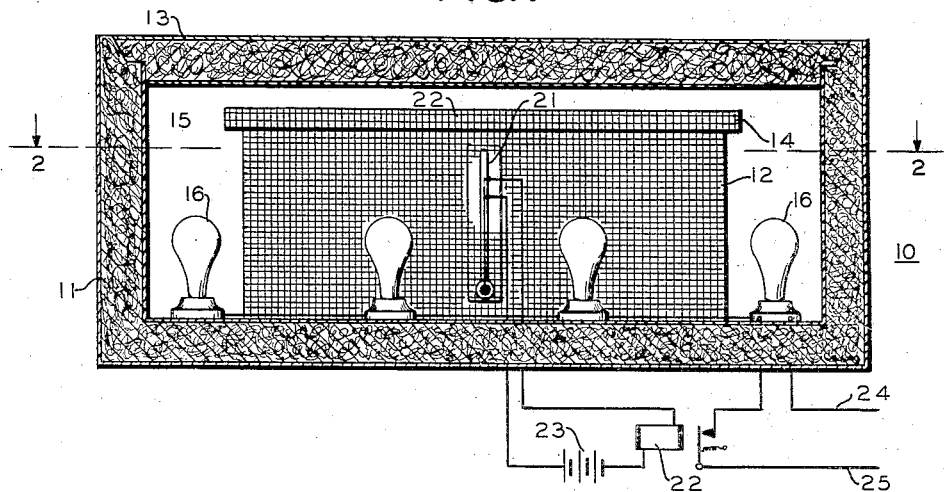

Oct. 6, 1936.  W. D. BUCKINGHAM ET AL  2,056,156
CONSTANT TEMPERATURE OVEN
Filed Aug. 3, 1933

INVENTOR
W. D. BUCKINGHAM
L. F. PARKER
BY
Eugene C. Brown
ATTORNEY

Patented Oct. 6, 1936

2,056,156

UNITED STATES PATENT OFFICE 2,056,156

CONSTANT TEMPERATURE OVEN

William D. Buckingham and Leighland F. Parker, Southampton, N. Y., assignors to The Western Union Telegraph Company, New York, N. Y., a corporation of New York Application August 3, 1933, Serial No. 683,530

6 Claims. (Cl. 219—19)

This invention relates to automatic temperature regulation, more particularly, the automatic regulation of the temperature of bodies, structures, and the like, such as electrically heated ovens which are heated by periodically supplying and withholding heat in response to the actions of a thermostat of the type which makes and breaks an electrical control circuit.

The principal object of this invention is to shorten or increase the rapidity of the cycle of operation of the thermostat in a system of heat control, thereby decreasing the range of temperature fluctuations in the heated bodies, or the limits between which the temperature of the body changes.

The principle of the "Dutch oven" is well known in systems of heat control where heat is supplied over a certain period, and effective over an intervening period during which the supply is withdrawn or cut off. The principles involved apply to an electrically heated oven which is controlled by a thermostat of the type which makes and breaks the heater circuit or which increases and decreases the current through the circuit in response to changes in temperature affecting the control element of the thermostat.

If heat is applied externally of an oven or other enclosed space, the temperature fluctuations of the interior do not pass through as wide a range as the exterior. In other words, the attenuating effects of the wall structure tend to maintain the internal temperature more nearly constant than the external. It follows then that if the range of external fluctuations is decreased or held within closer limits, or the frequency or rapidity of the heat cycle is increased, the ideal of a constant internal temperature is more closely approached. However, a range or variation in the temperature produced by a fluctuating heat supply cannot be entirely eliminated in systems controlled by the make and break type of thermostats, because the thermostat produces the control action only in response to changes in temperature. Inasmuch as the make and break type of thermostat is the most reliable and effective type in common use, an improvement in this type of temperature control is of considerable importance.

It is therefore an object of this invention to improve the response of the thermostat by employing a highly sensitive type so located that it responds quickly to temperature changes, thereby making it possible to reduce the temperature range and increase the frequency of the heat cycle.

A further object of this invention is to so dispose the thermostatic control element with relation to the outer surface of the walls of an oven or chamber that the range of temperature of fluctuations of the surface "skin" and the thermostatic element will remain substantially within the same limits.

A still further object is to treat the exposed surface of the thermostat actuating element and the structural walls of the oven or chamber so as to impart to both substantially the same heat absorption and radiating characteristics.

It is still another object of this invention to prevent a drift of mean temperature between that obtaining in the control element of the thermostat and that obtaining in the body being heated.

Figure 2:
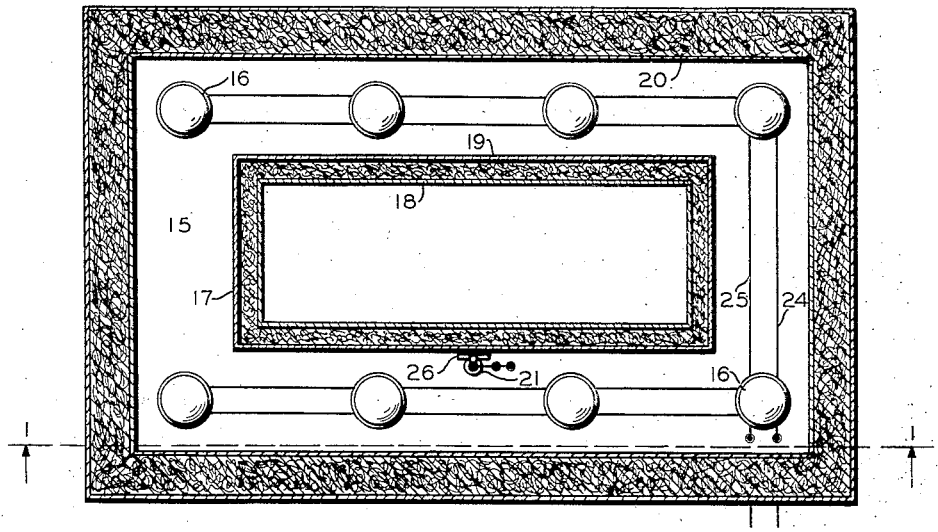

These and other objects will be apparent from the following description and claims taken in combination with the accompanying drawing forming a part of this application, in which Fig. 1 is a view in elevation, partly sectional, of a preferred form of the invention; and Fig. 2 is a plan view taken along the line 2—2 of Fig. 1.

In carrying out this invention a combination of at least three features are provided which greatly increases the constancy of stabilization of a thermostatically controlled heating system as applied to ovens and the like. The first of these features is that of placing the thermostat or at least the responsive element thereof in more or less direct contact with the surface of the chamber or oven within which the constant temperature is desired. In a temperature or control system of the type to which this invention applies, the thermostat provides the standard for the system. In other words, the limits at which the thermostat acts of course determines when a change in the heat to be applied is to be effected. Notwithstanding the ideas heretofore held that the thermostat should be separated from the surface of the chamber or body being heated to obviate any lag in the action of the thermostat consequent upon the tendency of the temperature lag in a large body over that in a small body, the advantages of imposing the standard of the thermostat upon the surface of the heated body by placing the thermostat or its responsive element in good thermal contact with the surface of the body more than offsets the disadvantage. In this manner the temperature recorded upon the thermostat can with definite assurance be reckoned as the temperature of the surface of the heated body.

The second feature employed herein is that of arranging the outward or front surface of the thermostatic element to be exposed to the same heat source both as to intensity and method of transfer as the surface of the body and further to treat the exposed surface of the thermostat and the body in such a manner as to produce a surface which has substantially the same rate of heat transfer with respect both to the heated surface of the body and the exposed surface of the thermostat. This, combined with the first feature of good thermal contact with the body, insures that there will be substantially no drift between the average temperature existing in the body and that existing in the thermostatic element.

Reckoned by standards heretofore largely practiced in the art, the above features may be considered as mitigating against a much desired characteristic of quick response of the thermostat so that the cyclic temperature changes produced may be very rapid in the matter of time and take place within very close limits. However, it is a well recognized characteristic of former types of control devices that there would be a change in the temperature gradient existing within the heat chamber whenever there was a great change in the outside temperature. This largely occurred because with a change such as the lowering of the outside temperature the portion of the cycle during which the chamber was exposed to an absorption of heat was lengthened or otherwise changed from that existing when the outside temperature was at some higher value. This brought about a drift between the average cyclic change of temperature in the heated body and the thermostat. However, when the body and the thermostat are treated according to the two features outlined above, this characteristic of the system is largely, if not entirely, overcome.

The use of a third feature embodied in the applicants' invention is believed to more than compensate for the advantages of a disconnected thermostat which must necessarily be sacrificed for obtaining the much desired characteristic as indicated. This third feature comprises submitting the exposed surface of the thermostat and the walls of the chamber to a treatment which produces in both a surface capable of rapid heat transfer. This may best be done by imparting a black roughened surface to each. Combined with the treatment increasing the heat transfer, it is preferred to employ a source of heat which is most effective for rapidly raising the temperature of the surfaces. The preferred form of such heat source is incandescent heat elements which transfer their heat largely by radiation. The extent to which such treatment increases or multiplies the frequency of the heat cycle may be best illustrated by an example experienced in the practice of this invention. A certain oven equipped with non-radiant heaters and having bright thermostatic and wall surfaces, operated at a heat cycle of twelve times per hour. When the same oven was equipped with radiant heaters and the exposed surface of the thermostat and the walls blackened, the system operated at a cycle frequency of three hundred times per hour, in other words, at a frequency about twenty-five times as great. Obviously the matter of supplying an attenuating characteristic to the walls of the oven which will maintain the temperature within the oven substantially constant is very materially reduced with the latter arrangement.

For a more complete description and a better understanding of the objects of this invention reference will now be had to the accompanying drawing.

Referring now to the drawing, illustrating the preferred form of the invention, a structure 10 is shown comprising an outer heat insulating wall 11 and an inner chamber 12 which constitutes the oven proper. The outer wall 11 may be in the form of a box-like structure with a removable cover 13. The inner chamber or oven 12 may also be in the form of a box-like structure with a removable cover 14. The inner chamber 12 is of sufficiently smaller dimensions than the outer chamber to provide a suitable intervening space 15 within which heating elements 16 may be distributed around the inner chamber.

The walls of the inner chamber preferably comprise an outer or skin layer of metal 17, or some other material which will readily absorb and conduct heat, a similar inner skin layer, 18, and an intermediate portion, 19, preferably comprised of a substantial thickness of material of a character, such as wood, asbestos or the like, which gives to the wall as a whole a substantial heat attenuating characteristic so that the fluctuations in the heat supply to the oven do not readily penetrate to the space enclosed within the chamber. The metallic surface of the skin portion of the wall, besides performing special functions in cooperating with the thermostatic element hereinafter described, by its absorption receives the heat and by its conduction acts to more evenly distribute the heat over the exterior wall surface of the chamber. The inner conducting skin further distributes the heat, producing substantially an even temperature over the entire inner wall. It is not essential, however, to carry out the principles of this invention that this type of wall structure be employed.

It is preferable that the inner surface 20 of the outer wall structure 11 comprise a polished or silvered surface or other suitable heat reflecting surface. This reflects the heat from the source back upon the walls of the oven or inner chamber. It also tends to diffuse or distribute the heat more evenly over the oven wall surface.

The heating elements 16 are illustrated as incandescent lamps. The use of an incandescent form of heating element is preferred because of the fact that it emits its heat largely by radiation, and thus quickly transmits it to the walls of the inner chamber or other structure to be heated. However, any form of heating element which emits a substantial portion of its heat by radiation may be employed.

A thermostatic element 21 is employed for opening and closing the heater circuit as the temperature rises or falls to the operating limits of the thermostat. It has been found that the most sensitive type of thermostat which may be employed when the temperature conditions permit of its use is what is known as the mercury bulb type of thermostat which is constructed in the form of ordinary mercury type thermometer with the mercury bulb at its lower end connected with a column extending upwardly through an evacuated glass tube. In the sides of this tube at suitably spaced intervals are inserted metallic contact elements which complete a circuit through the mercury column when it is at such a height as to include both contacts. These contacts are connected in a circuit of a relay 22 provided with a potential source such as battery 23. This arrangement operates in a well known manner to open and close the circuit provided by conductors 24 and 25 which supply current to the heating elements.

The important operating characteristics of the heat control system arranged according to this invention result from the combination of the type of heating elements employed with the arrangement and condition of the thermostat to give it the desired operating characteristics of rapid response within a narrower range of limiting temperatures, as will now be described. In the first place, the thermostat according to this invention is disposed externally of the oven and mounted so as to receive the direct rays of heat from the heating elements. This causes the glass and the mercury in the bulb of the thermostat to be heated very rapidly, causing the thermostat to open the heater circuit within a space of time very much shorter than if the thermostat had to receive its heat in a slow or indirect method. However, for the best operating characteristics the thermostat operates at upper and lower temperature limits which correspond very closely to the actual limits of the range of temperature change in the body being heated. This result is obtained by partially imbedding the bulb and tube of the thermostat in a heat conducting block 24 which is fastened to the outer wall of the chamber 12 in such a manner that heat transfer is possible when there occurs any difference in temperature between the thermostatic elements and the adjacent wall surface of the chamber. In other words if the thermostat tends to heat up at a more rapid rate than the surface or metallic "skin" portion of the inner chamber walls heat would flow from the thermostat elements to the walls and tend to hold the temperature rise of the thermostat in check until the "skin" of the walls itself reached substantially the critical response temperature of the thermostat. Likewise if the temperature of the thermostat tended to lag behind the temperature of the walls the heat transfer in the other direction would take place.

According to this invention the rapid heating and rapid cooling of the thermostat may be further greatly facilitated by treating the exposed surface of the element forming the thermostat in a special manner to render it particularly effective in absorbing heat. This may be done by treating the element surfaces or the enclosing surfaces in any suitable manner which will produce a heat absorbing surface having a slight attenuating effect, such as blackening. A blackened surface absorbs heat much more rapidly than other types of surfaces because reflection of the heat is substantially eliminated. A blackening surface which produces a more or less dead black or unpolished surface is preferred due to the fact that it will aid the thermostat to dissipate its heat to the surrounding atmosphere more rapidly during periods when the heating elements are deenergized. In order to give to the exterior surfaces of the oven of chamber 12 substantially the same heat response characteristics as the thermostat, these wall surfaces are also preferably treated with a blackening substance or otherwise to give them similar characteristics to the surface of the thermostat elements.

When the thermostatic control elements of a heating system are arranged substantially as described above, not only will the thermostat respond more rapidly to the application of heat and thus more quickly reach its upper or cut-off temperature limit, but it will also dissipate its heat very rapidly and quickly reach its lower or circuit closing temperature limit. The portion of the thermostatic elements which are exposed directly to the heat rays also provide a surface in intimate contact with the surrounding atmosphere through which the heat of the thermostat may be quickly dissipated during periods when the heater circuit is open. The heat of the thermostat may also be dissipated through the block or portion of the chamber surface in which it is imbedded when the heat dissipation from the "skin" or surface portion of the wall itself is more rapid than that of the thermostat direct to the surrounding atmosphere.

From the foregoing description it will be seen that we have combined the arrangement of the heat source externally of the oven or chamber in which the temperature is to be controlled with the location of the thermostat upon the surface of the oven wall in exchange relation therewith and in the direct rays of the source of heat, together with a treatment of the portions of the surface of the wall and the thermostat exposed to the heat so that they will rapidly take up and give out heat at substantially the same rate, and a heat control system has been provided which operates on a heat cycle of greatly accelerated frequency and within an accurately controlled range, rendering the rapid cyclic heat fluctuations thus produced readily absorbed by a suitable attenuating oven or chamber wall resulting in a temperature within the chamber which remains constant within a small fraction of a degree.

While this invention has been described as applied to ovens heated by electricity in the well known manner, it may be equally well applied to other types of heating systems in which similar principles of control are involved. It will further be apparent to those skilled in the art that various changes and modifications of the embodiment described may be made without departing from the spirit of the invention and it is desired therefore that only such limitations shall be placed thereon as is imposed by the prior art or set forth by the appended claims.

What we claim is:

1. Heat control apparatus comprising an outer insulated oven, radiant heaters within said oven, an inner oven having an outer heat distributing layer subject to said radiant heaters and an inner attenuating layer, a thermostatic control device for said heaters closely thermally associated with said outer heat distributing layer and also subject to said radiant heaters, said thermostatic control device and heat distributing layer having similar and good heat absorbing surfaces.

2. Heat control apparatus comprising an outer insulated oven, a source of radiant heat within said oven, an inner constant temperature oven having an outer heat distributing layer subject to said source of radiant heat and an inner attenuating layer, a thermostatic control device for said heater closely thermally associated with the heat distributing layer and also subject to said source of radiant heat, said electrostatic control device and heat distributing layer having similar and good heat absorbing surfaces.

3. Heat control apparatus comprising an outer insulated oven, a source of radiant heat within said oven, an inner constant temperature oven having an outer heat distributing layer subject to said source of radiant heat and an inner attenuating layer, means for controlling said source of radiant heat comprising a thermostatic control device attached to the outer heat distributing layer and closely thermally associated therewith and also subject to the source of radiant heat, said thermostatic control device and heat distributing layer having similar and good heat absorbing surfaces.

4. Heat control apparatus comprising an outer insulated oven, a source of radiant heat within said oven, an inner constant temperature oven having an outer heat distributing layer subject to said source of radiant heat and an inner attenuating layer, a thermostatic control device for said heater closely thermally associated with the heat distributing layer and also directly subject to said source of radiant heat, said thermostatic control device and heat distributing layer having surfaces providing substantially the same rate of heat transfer per unit area of said surfaces.

5. Heat control apparatus comprising an outer insulated oven, a source of radiant heat within said oven, an inner constant temperature oven having an outer heat distributing layer subject to said source of radiant heat and an inner attenuating layer, a thermostatic control device for said heater closely thermally associated with the heat distributing layer and also subject to said source of radiant heat, said outer heat distributing layer and said thermostatic control device each having a surface comprising a black coating to provide similar and good heat absorbing surfaces.

6. Heat control apparatus comprising an outer insulated oven, a source of radiant heat within said oven, an inner constant temperature oven having an outer heat distributing layer subject to said source of radiant heat and an inner attenuating layer, a thermostatic control device for said heater closely thermally associated with the heat distributing layer and also directly subject to said source of radiant heat, said outer heat distributing layer and said thermostatic control device each having a surface comprising a black roughened coating to provide similar and good heat absorbing surfaces.

WILLIAM D. BUCKINGHAM.
LEIGHLAND F. PARKER.